United States Patent [19]
Inoue

[11] Patent Number: 5,740,322
[45] Date of Patent: Apr. 14, 1998

[54] FUZZY-NEURAL NETWORK SYSTEM

[75] Inventor: Tsuyoshi Inoue, Chiba, Japan

[73] Assignee: Sharp Kabushiki Kaisha, Osaka, Japan

[21] Appl. No.: 622,523

[22] Filed: Mar. 25, 1996

[30] Foreign Application Priority Data

Apr. 12, 1995 [JP] Japan .................... 7-087158

[51] Int. Cl.$^6$ ........................ G06F 15/00; G06F 15/18; G06G 7/00
[52] U.S. Cl. ................ 395/10; 395/3; 395/61; 395/900; 395/21; 395/23; 395/24
[58] Field of Search ................ 395/3, 61, 900, 395/22, 10, 23, 24, 21

[56] References Cited

U.S. PATENT DOCUMENTS 5,524,176  6/1996  Narita et al. ....................... 395/22

FOREIGN PATENT DOCUMENTS

| | | | |
|---|---|---|---|
| 4-092901 | 3/1992 | Japan | G05B 13/02 |
| 6-161761 | 6/1992 | Japan | . |
| 5-073323 | 3/1993 | Japan | G06F 9/44 |
| 5-224939 | 9/1993 | Japan | G06F 9/44 |
| 6-096219 | 4/1994 | Japan | G06F 15/70 |
| 6-119175 | 4/1994 | Japan | G06F 9/44 |

OTHER PUBLICATIONS

Okada et al. "Initializing Multilayer Neural Networks with Fuzzy Logic." Proceedings of the 1992 International Joint Conference on Neural Networks (IJCNN), vol. 1, pp. 239–244, Jun. 1992.

Sulzberger et al. "FUN: Optimization of Fuzzy Rule Based Systems Using Neural Networks," Neural Networks, 1993 International Conference, pp. 312–316, 1993.

Kawamura et al., "Neurofuzzy System—An Overview and a Prototype System," in *Participating Symposium to IIASA: Recent Developments and the Latest Applications of Neurofuzzy System*, Nov. 1992, pp. 180–187.

Okada, et al., Initializing Multilayer Neural Networks with Fuzzy Logic, 1992, vol. 1, pp. 188–193.

Horikawa, et al., On Fuzzy Modeling Using Neural Networks with the Back-Propagation Algorithm, 1992, vol. 3, pp. 801–806.

English–language abstract of JP 4–092901, Uchikawa.
English–language abstract of JP 5–073323, Asogawa.
English–language abstract of JP 5–224939, Kawamura.
English–language abstract of JP 6–119175, Kawamura.
English–language abstract of JP 6–161761, Kawamura.

*Primary Examiner*—Tariq R. Hafiz
*Assistant Examiner*—Jason W. Rhodes
*Attorney, Agent, or Firm*—David G. Conlin, Esq.

[57] ABSTRACT

A fuzzy neural network system includes a learning function. The learning is performed by determining degrees of coincidence of rules from combinations of membership functions for realizing fuzzy rules, constructing a network based on the number of input and output items, in such a manner as to produce output in conformity with the degrees of coincidence, to thereby properly simulate relations between input and output as to sample data represented by a subject input pattern and an output pattern corresponding thereto. The system further includes a fuzzy rule setup portion for programming fuzzy rules created by engineers into the fuzzy neural network, a fuzzy rule extracting portion for extracting each fuzzy rule from the network after a learning period, and a degree-of-importance extracting portion which extracts, for each input, a respective contribution ratio of each input on each output in the network, after a learning period. In a preferred embodiment, the network structure includes an input layer, a membership layer having front and rear halves, a rule layer, and an output layer.

4 Claims, 22 Drawing Sheets

FIG. 2A PRIOR ART
| rule1 | if (X1 is small) and (X2 is small) then Y is middle |
|---|---|
| rule2 | if (X1 is small) and (X2 is big) then Y is big |
| rule3 | if (X1 is middle) then Y is small |
| rule4 | if (X1 is big) and (X2 is small) then Y is middle |
| rule5 | if (X1 is big) and (X2 is big) then Y is big |
FIG. 2B PRIOR ART
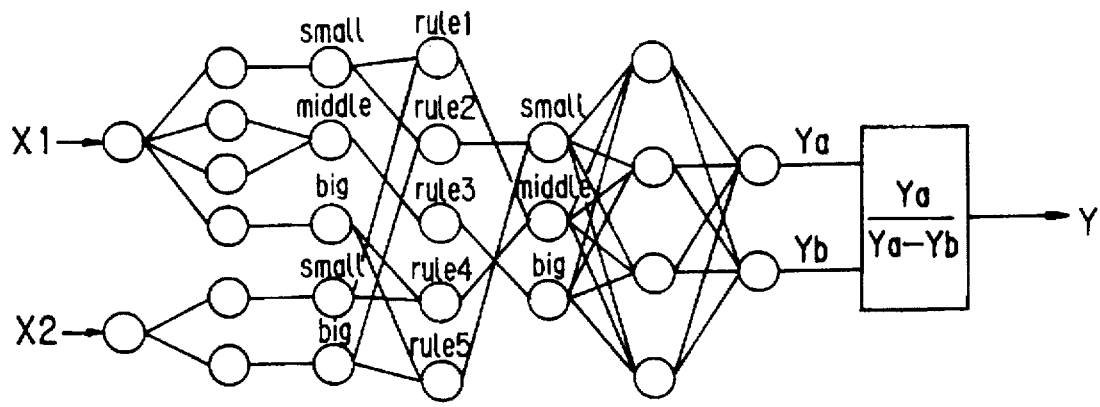
FIG. 3 PRIOR ART
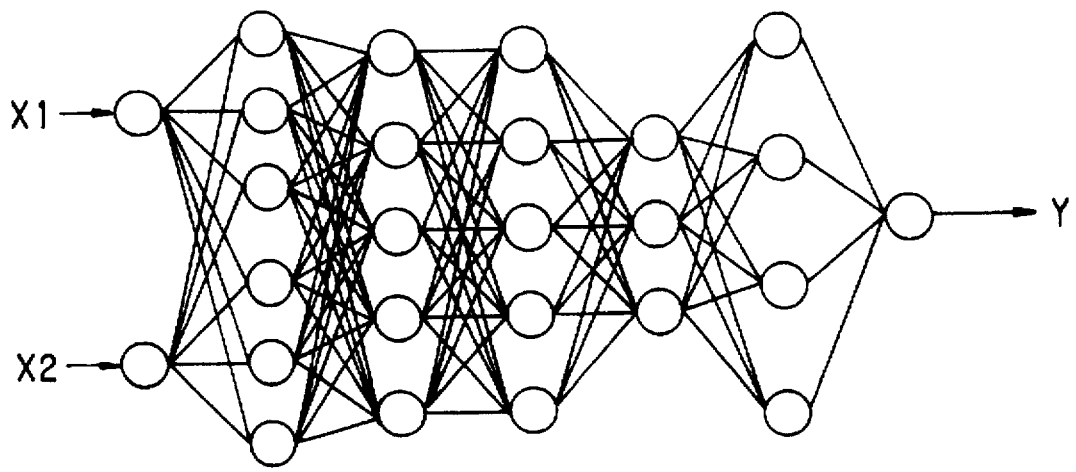

FIG.11

| | X2 is Small | X2 is Middle | X2 is Middle |
|---|---|---|---|
| X1 is Small | 0 | 0 | 0 |
| X1 is Middle | 0 | 0 | 0 |
| X1 is Big | 0 | 0 | 0 |

| | X3 is Small | X3 is Middle | X3 is Big |
|---|---|---|---|
| X1 is Small | 0 | 0 | 0 |
| X1 is Middle | 0 | 0 | 0 |
| X1 is Big | 0 | 0 | 0 |

| | X3 is Small | X3 is Middle | X3 is Big |
|---|---|---|---|
| X2 is Small | 0 | 0 | 0 |
| X2 is Middle | 0 | 0 | 0 |
| X2 is Middle | 0 | 0 | 0 |

FIG. 12

|  | X2 is Small | X2 is Middle | X2 is Middle |
|---|---|---|---|
| X1 is Small | 1 | 1 | 1 |
| X1 is Middle | −1 | −1 | −1 |
| X1 is Big | 1 | 1 | 1 |

|  | X3 is Small | X3 is Middle | X3 is Big |
|---|---|---|---|
| X1 is Small | 1 | 1 | 1 |
| X1 is Middle | −1 | −1 | −1 |
| X1 is Big | 1 | 1 | 1 |

|  | X3 is Small | X3 is Middle | X3 is Big |
|---|---|---|---|
| X2 is Small | 0 | 0 | 0 |
| X2 is Middle | 0 | 0 | 0 |
| X2 is Middle | 0 | 0 | 0 |

FIG. 13

|  | X2 is Small | X2 is Middle | X2 is Middle |
|---|---|---|---|
| X1 is Small | 0 | 1 | 2 |
| X1 is Middle | −2 | −1 | 0 |
| X1 is Big | 0 | 1 | 2 |

|  | X3 is Small | X3 is Middle | X3 is Big |
|---|---|---|---|
| X1 is Small | 1 | 1 | 1 |
| X1 is Middle | −1 | −1 | −1 |
| X1 is Big | 1 | 1 | 1 |

|  | X3 is Small | X3 is Middle | X3 is Big |
|---|---|---|---|
| X2 is Small | −1 | −1 | −1 |
| X2 is Middle | 0 | 0 | 0 |
| X2 is Middle | 1 | 1 | 1 |

FIG. 14

|  | X2 is Small | X2 is Middle | X2 is Middle |
|---|---|---|---|
| X1 is Small | 0 | 1 | 2 |
| X1 is Middle | -2 | -1 | 0 |
| X1 is Big | 0 | 1 | 2 |

|  | X3 is Small | X3 is Middle | X3 is Big |
|---|---|---|---|
| X1 is Small | 0 | 1 | 2 |
| X1 is Middle | -2 | -1 | 0 |
| X1 is Big | 0 | 1 | 2 |

|  | X3 is Small | X3 is Middle | X3 is Big |
|---|---|---|---|
| X2 is Small | -2 | -1 | 0 |
| X2 is Middle | -1 | 0 | 1 |
| X2 is Middle | 0 | 1 | 2 |

FIG. 15

|  | X2 is Small | X2 is Middle | X2 is Middle |
|---|---|---|---|
| X1 is Small | 0 | 1 | 2 |
| X1 is Middle | −2 | −1 | 0 |
| X1 is Big | 0 | 1 | 2 |

|  | X3 is Small | X3 is Middle | X3 is Big |
|---|---|---|---|
| X1 is Small | 0 | 1 | 2 |
| X1 is Middle | −2 | −1 | 0 |
| X1 is Big | 0 | 1 | 2 |

|  | X3 is Small | X3 is Middle | X3 is Big |
|---|---|---|---|
| X2 is Small | −3 | −1 | 0 |
| X2 is Middle | −1 | 0 | 1 |
| X2 is Middle | 0 | 1 | 3 |

301 — points to the X2 is Small row
302 — points to the 3 in the last row

FIG.16

| | X2 is Small | X2 is Middle | X2 is Middle |
|---|---|---|---|
| X1 is Small | 0 | 1 | 2 |
| X1 is Middle | -2 | -1 | 0 |
| X1 is Big | 0 | 1 | 2 |

| | X3 is Small | X3 is Middle | X3 is Big |
|---|---|---|---|
| X1 is Small | 0 | 1 | 2 |
| X1 is Middle | -2 | -1 | 0 |
| X1 is Big | 0 | 1 | 2 |

| | X3 is Small | X3 is Middle | X3 is Big |
|---|---|---|---|
| X2 is Small | -2 | -1 | 0 |
| X2 is Middle | -1 | 0 | 1 |
| X2 is Middle | 0 | 1 | 2 |

—301 (second row)
—302 (third row)

FIG. 19

| INPUT 1 | INPUT 2 | INPUT 3 | INPUT 4 | INPUT 5 | INPUT 6 | INPUT 7 | INPUT 8 | INPUT 9 | OUTPUT |
|---|---|---|---|---|---|---|---|---|---|
| 40.0 | 14.0 | 4.0 | 462.0 | 1.5 | 1.5 | 1.0 | 0.0 | 130.0 | 40.0 |
| 40.0 | 14.0 | 4.0 | 466.0 | 1.5 | 0.0 | 1.0 | 0.0 | 130.0 | 70.0 |
| 35.0 | 11.0 | 4.0 | 556.0 | 1.5 | 0.0 | 1.0 | 0.0 | 130.0 | 110.0 |
| 45.0 | 12.0 | 4.0 | 668.0 | 1.5 | 0.0 | 1.0 | 0.0 | 130.0 | 50.0 |
| 38.0 | 11.0 | 4.1 | 675.0 | 1.5 | 0.0 | 1.0 | 0.0 | 130.0 | 90.0 |
| 60.0 | 13.0 | 4.7 | 387.0 | 0.0 | 1.5 | 1.0 | 0.0 | 130.0 | 80.0 |
| 45.0 | 12.0 | 4.1 | 681.0 | 3.0 | 0.0 | 1.0 | 0.0 | 130.0 | 40.0 |
| 45.0 | 12.0 | 3.9 | 681.0 | 0.0 | 1.5 | 1.0 | 0.0 | 130.0 | 20.0 |
| 45.0 | 12.0 | 3.9 | 649.0 | 1.5 | 0.0 | 1.0 | 0.0 | 130.0 | 40.0 |
| 42.0 | 12.0 | 3.9 | 781.0 | 0.0 | 1.5 | 1.0 | 0.0 | 130.0 | 10.0 |
| 42.0 | 12.0 | 3.9 | 781.0 | 0.0 | 1.5 | 1.0 | 0.0 | 170.0 | 20.0 |
| 45.0 | 12.0 | 3.9 | 681.0 | 0.0 | 2.0 | 1.0 | 0.0 | 130.0 | 10.0 |
| 35.0 | 12.0 | 3.9 | 550.0 | 0.0 | 1.5 | 0.0 | 1.0 | 130.0 | 100.0 |
| 35.0 | 12.0 | 3.9 | 550.0 | 0.0 | 2.0 | 0.0 | 1.0 | 130.0 | 80.0 |
| 37.0 | 12.0 | 4.0 | 810.0 | 0.0 | 1.5 | 1.0 | 0.0 | 130.0 | 40.0 |
| 37.0 | 12.0 | 4.0 | 810.0 | 0.0 | 2.0 | 0.0 | 1.0 | 130.0 | 20.0 |
| 39.0 | 12.0 | 4.0 | 820.0 | 0.0 | 1.5 | 1.0 | 0.0 | 130.0 | 30.0 |
| 42.0 | 13.0 | 4.1 | 770.0 | 0.0 | 2.0 | 0.0 | 1.0 | 130.0 | 10.0 |

FIG. 20

| INPUT 1 | INPUT 2 | INPUT 3 | INPUT 4 | INPUT 5 | INPUT 6 | INPUT 7 | INPUT 8 | INPUT 9 | OUTPUT |
|---|---|---|---|---|---|---|---|---|---|
| 40.0 | 14.0 | 4.0 | 466.0 | 1.5 | 0.0 | 1.0 | 0.0 | 130.0 | 70.0 |
| 35.0 | 11.0 | 4.0 | 556.0 | 1.5 | 0.0 | 1.0 | 0.0 | 130.0 | 110.0 |
| 38.0 | 11.0 | 4.1 | 675.0 | 1.5 | 0.0 | 1.0 | 0.0 | 130.0 | 90.0 |
| 60.0 | 13.0 | 4.7 | 387.0 | 0.0 | 1.5 | 1.0 | 0.0 | 130.0 | 80.0 |
| 45.0 | 12.0 | 3.9 | 681.0 | 0.0 | 1.5 | 1.0 | 0.0 | 130.0 | 20.0 |
| 45.0 | 12.0 | 3.9 | 649.0 | 1.5 | 0.0 | 1.0 | 0.0 | 130.0 | 40.0 |
| 42.0 | 12.0 | 3.9 | 781.0 | 0.0 | 1.5 | 1.0 | 0.0 | 170.0 | 20.0 |
| 45.0 | 12.0 | 3.9 | 681.0 | 0.0 | 2.0 | 1.0 | 0.0 | 130.0 | 10.0 |
| 35.0 | 12.0 | 3.9 | 550.0 | 0.0 | 2.0 | 0.0 | 1.0 | 130.0 | 80.0 |
| 37.0 | 12.0 | 4.0 | 810.0 | 0.0 | 1.5 | 1.0 | 0.0 | 130.0 | 40.0 |
| 39.0 | 12.0 | 4.0 | 820.0 | 0.0 | 1.5 | 1.0 | 0.0 | 130.0 | 30.0 |
| 42.0 | 13.0 | 4.1 | 770.0 | 0.0 | 2.0 | 0.0 | 1.0 | 130.0 | 10.0 |

FIG.21

| INPUT 1 | INPUT 2 | INPUT 3 | INPUT 4 | INPUT 5 | INPUT 6 | INPUT 7 | INPUT 8 | INPUT 9 | OUTPUT |
|---|---|---|---|---|---|---|---|---|---|
| 40.0 | 14.0 | 4.0 | 466.0 | 1.5 | 0.0 | 1.0 | 0.0 | 130.0 | 70.0 |
| 38.0 | 11.0 | 4.1 | 675.0 | 1.5 | 0.0 | 1.0 | 0.0 | 130.0 | 90.0 |
| 45.0 | 12.0 | 3.9 | 681.0 | 0.0 | 1.5 | 1.0 | 0.0 | 130.0 | 20.0 |
| 42.0 | 12.0 | 3.9 | 781.0 | 0.0 | 1.5 | 1.0 | 0.0 | 170.0 | 20.0 |
| 35.0 | 12.0 | 3.9 | 550.0 | 0.0 | 2.0 | 0.0 | 1.0 | 130.0 | 80.0 |
| 39.0 | 12.0 | 4.0 | 820.0 | 0.0 | 1.5 | 1.0 | 0.0 | 130.0 | 30.0 |

FIG.22

| INPUT 1 | INPUT 2 | INPUT 3 | INPUT 4 | INPUT 5 | INPUT 6 | INPUT 7 | INPUT 8 | INPUT 9 | OUTPUT |
|---|---|---|---|---|---|---|---|---|---|
| 40.0 | 14.0 | 4.0 | 462.0 | 1.5 | 0.0 | 1.0 | 0.0 | 130.0 | 70.0 |
| 40.0 | 12.0 | 4.0 | 611.0 | 1.5 | 0.0 | 1.0 | 0.0 | 130.0 | 90.0 |
| 45.0 | 12.0 | 4.0 | 688.0 | 1.5 | 0.0 | 1.0 | 0.0 | 130.0 | 40.0 |
| 45.0 | 12.0 | 3.9 | 681.0 | 0.0 | 3.0 | 0.0 | 0.0 | 130.0 | 10.0 |
| 37.0 | 12.0 | 4.0 | 810.0 | 0.0 | 2.0 | 0.0 | 1.0 | 170.0 | 0.0 |
| 37.0 | 12.0 | 4.0 | 750.0 | 0.0 | 2.0 | 0.0 | 1.0 | 170.0 | 410.0 |

FIG.23

| RULES RELATING TO ONE INPUT PARAMETER |
|---|
| if input 1 is Big then output is Small |
| if input 2 is Big then output is Small |
| if input 3 is Big then output is Small |
| if input 4 is Big then output is Small |
| if input 5 is Big then output is Small |
| if input 6 is Big then output is Small |
| if input 7 is Big then output is Small |
| if input 8 is Big then output is Small |
| if input 9 is Big then output is Small |

FIG.24

| RULES RELATING TO TWO INPUT PARAMETERS | |
|---|---|
| if input 1 is Big and input 2 is Small then output is Small | if input 3 is Big and input 7 is Big then output is Small |
| if input 1 is Big and input 3 is Big then output is Small | if input 3 is Big and input 8 is Big then output is Small |
| if input 1 is Big and input 4 is Big then output is Small | If input 3 is Big and input 9 is Big then output is Small |
| if input 1 is Big and input 5 is Big then output is Small | if input 4 is Big and input 5 is Big then output is Small |
| if input 1 is Big and input 6 is Big then output is Small | if input 4 is Big and input 6 is Big then output is Small |
| if input 1 is Big and input 7 is Big then output is Small | if input 4 is Big and input 7 is Big then output is Small |
| if input 1 is Big and input 8 is Big then output is Small | if input 4 is Big and input 8 is Big then output is Small |
| if input 1 is Big and input 9 is Big then output is Small | if input 4 is Big and input 9 is Big then output is Small |
| if input 2 is Small and input 3 is Big then output is Small | if input 5 is Big and input 6 is Big then output is Small |
| if input 2 is Small and input 4 is Big then output is Small | if input 5 is Big and input 7 is Big then output is Small |
| if input 2 is Small and input 5 is Big then output is Small | if input 5 is Big and input 8 is Big then output is Small |
| if input 2 is Small and input 6 is Big then output is Small | if input 5 is Big and input 9 is Big then output is Small |
| if input 2 is Small and input 7 is Big then output is Small | if input 6 is Big and input 7 is Big then output is Small |
| if input 2 is Small and input 8 is Big then output is Small | if input 6 is Big and input 8 is Big then output is Small |
| if input 2 is Small and input 9 is Big then output is Small | if input 6 is Big and input 9 is Big then output is Small |
| if input 3 is Big and input 4 is Big then output is Small | if input 7 is Big and input 8 is Big then output is Small |
| if input 3 is Big and input 5 is Big then output is Small | if input 7 is Big and input 9 is Big then output is Small |
| if input 3 is Big and input 6 is Big then output is Small | if input 8 is Big and input 9 is Big then output is Small |

FIG.25

| | NUMBER OF TIMES OF EDUCATION | | | |
|---|---|---|---|---|
| | WITHOUT RULE (INITIAL VALUES SET AT RANDOM) | | | WITH RULES |
| 18 EDUCATING DATA | 633 | 510 | 543 | 495 |
| 12 EDUCATING DATA | 837 | 734 | 1019 | 828 |
| 6 EDUCATING DATA | TARGET UNSATISFIED | TARGET UNSATISFIED | TARGET UNSATISFIED | 26064 |

FIG.26

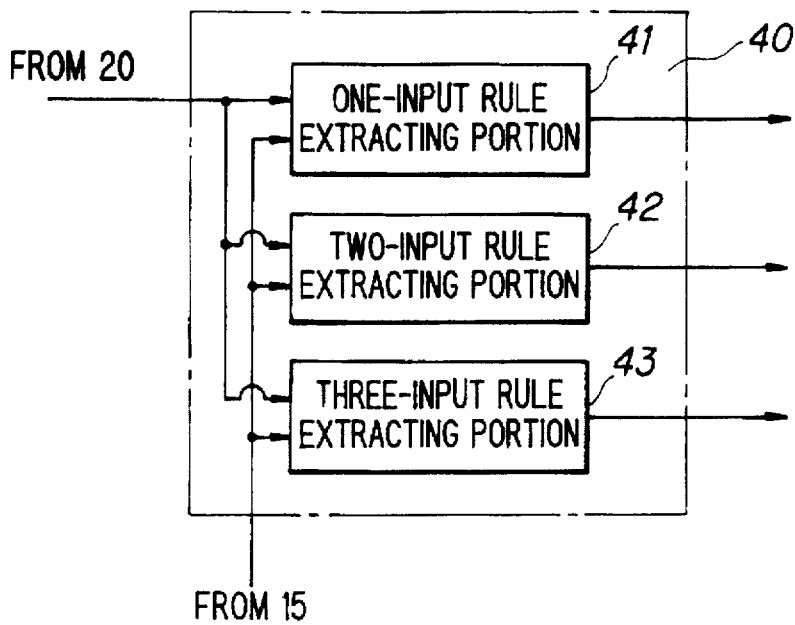

FROM 20 → ONE-INPUT RULE EXTRACTING PORTION (41)
TWO-INPUT RULE EXTRACTING PORTION (42)
THREE-INPUT RULE EXTRACTING PORTION (43)
FROM 15
(40)

FIG.27

| EXTRACTED RESULT FROM ONE-INPUT RULE PORTION | CONVERTED RULE (WHEN OUTPUT IS BIG) |
|---|---|
| Small<Middle<Big | X1 is Big then Y is Big |
| Small>Middle>Big | X1 is Small then Y is Big |
| Small<Middle>Big | X1 is Middle then Y is Big |
| Small>Middle<Big | X1 is Small or X1 is Big then Y is Big |

FIG.28

| EXTRACTED RESULT FROM ONE-INPUT RULE PORTION | CONVERTED RULE (WHEN OUTPUT IS SMALL) |
|---|---|
| Small<Middle<Big | X1 is Small then Y is Small |
| Small>Middle>Big | X1 is Big then Y is Small |
| Small<Middle>Big | X1 is Small or X1 is Big then Y is Small |
| Small>Middle<Big | X1 is Middle then Y is Small |

FIG. 29

| EXTRACTED RESULT FROM TWO-INPUT RULE PORTION | | CONVERTED RULE (WHEN OUTPUT IS BIG) |
|---|---|---|
| INPUT X1 | INPUT X2 | |
| Small<Middle<Big | Small<Middle<Big | X1 is Big and X2 is Big then Y is Big |
| Small<Middle<Big | Small>Middle>Big | X1 is Big and X2 is Small then Y is Big |
| Small<Middle<Big | Small<Middle>Big | X1 is Big and X2 is Middle then Y is Big |
| Small<Middle<Big | Small>Middle<Big | X1 is Big and (X2 is Small or X2 is Big) then Y is Big |
| Small>Middle>Big | Small<Middle<Big | X1 is Small and X2 is Big then Y is Big |
| Small>Middle>Big | Small>Middle>Big | X1 is Small and X2 is Small then Y is Big |
| Small>Middle>Big | Small<Middle>Big | X1 is Small and X2 is Middle then Y is Big |
| Small>Middle>Big | Small>Middle<Big | X1 is Small and (X2 is Small or X2 is Big) then Y is Big |
| Small<Middle>Big | Small<Middle<Big | X1 is Middle and X2 is Big then Y is Big |
| Small<Middle>Big | Small>Middle>Big | X1 is Middle and X2 is Small then Y is Big |
| Small<Middle>Big | Small<Middle>Big | X1 is Middle and X2 is Middle then Y is Big |
| Small<Middle>Big | Small>Middle<Big | X1 is Middle and (X2 is Small or X2 is Big) then Y is Big |
| Small>Middle<Big | Small<Middle<Big | (X1 is Small or X1 is Big) and X2 is Big then Y is Big |
| Small>Middle<Big | Small>Middle>Big | (X1 is Small or X1 is Big) and X2 is Small then Y is Big |
| Small>Middle<Big | Small<Middle>Big | (X1 is Small or X1 is Big) and X2 is Middle then Y is Big |
| Small>Middle<Big | Small>Middle<Big | (X1 is Small or X1 is Big) and (X2 is Small or X2 is Big) then Y is Big |

FIG.30

| EXTRACTED RESULT FROM TWO-INPUT RULE PORTION | | CONVERTED RULE (WHEN OUTPUT IS SMALL) |
|---|---|---|
| INPUT X1 | INPUT X2 | |
| Small<Middle<Big | Small<Middle<Big | X1 is Small and X2 is Small then Y is Small |
| Small<Middle<Big | Small>Middle>Big | X1 is Small and X2 is Big then Y is Small |
| Small<Middle<Big | Small<Middle>Big | X1 is Small and (X2 is Small or X2 is Big) then Y is Small |
| Small<Middle<Big | Small>Middle<Big | X1 is Small and X2 is Middle then Y is Small |
| Small>Middle>Big | Small<Middle<Big | X1 is Big and X2 is Small then Y is Small |
| Small>Middle>Big | Small>Middle>Big | X1 is Big and X2 is Big then Y is Small |
| Small>Middle>Big | Small<Middle>Big | X1 is Big and (X2 is Small or X2 is Big) then Y is Small |
| Small>Middle>Big | Small>Middle<Big | X1 is Big and X2 is Middle then Y is Small |
| Small<Middle>Big | Small<Middle<Big | (X1 is Small or X1 is Big) and X2 is Small then Y is Small |
| Small<Middle>Big | Small>Middle>Big | (X1 is Small or X1 is Big) and X2 is Big then Y is Small |
| Small<Middle>Big | Small<Middle>Big | (X1 is Small or X1 is Big) and (X2 is Small or X2 is Big) then Y is Small |
| Small<Middle>Big | Small>Middle<Big | (X1 is Small or X1 is Big) and X2 is Middle then Y is Small |
| Small>Middle<Big | Small<Middle<Big | X1 is Middle and X2 is Small then Y is Small |
| Small>Middle<Big | Small>Middle>Big | X1 is Middle and X2 is Big then Y is Small |
| Small>Middle<Big | Small<Middle>Big | X1 is Middle and (X2 is Small or X2 is Big) then Y is Small |
| Small>Middle<Big | Small>Middle<Big | X1 is Middle and X2 is Middle then Y is Small |

FIG.31

| SUMMATION OF WEIGHTS OF RULES RELATING TO OUTPUT Y | X2 is Small | | | X2 is Middle | | | X2 is Big | | |
|---|---|---|---|---|---|---|---|---|---|
| | X3 is Small | X3 is Middle | X3 is Big | X3 is Small | X3 is Middle | X3 is Big | X3 is Small | X3 is Middle | X3 is Big |
| X1 is Small | 401 | | | | | | | | |
| X1 is Middle | | | | | | | | | |
| X1 is Big | | | | | | | | | | 402 |

FUZZY-NEURAL NETWORK SYSTEM

BACKGROUND OF THE INVENTION

(1) Field of the Invention

The present invention relates to a fuzzy-neural network system using fuzzy inference and neural networks, and particularly relates to a fuzzy-neural network system in which fuzzy rules made by engineers can be set up in the network and fuzzy rules can automatically be extracted from the network after education or contribution ratios of input values to the variation of the output can automatically be extracted.

(2) Description of the Prior Art

Conventionally, fuzzy-neural network systems in which fuzzy inference and neural-networks are integrated have been known. Of these, there is a network having no membership function in the consequent portion as shown in FIG. 1 (see Japanese Patent Application Laid-Open Hei 5 No.73, 323, for example). In this network, no particular reference was made to whether connection weights between nodes be set at arbitrary values or at certain determined values.

There is another configuration in which when fuzzy rules created by engineers are to be set up into a network, the network (see FIG. 2B) is formed in conformity with the rules (see FIG. 2A). (See Japanese Patent Application Laid-Open Hei 5 No.224,939, for example.)

There is still another configuration in which when there are no engineer's rules, a pure neuro-system as shown in FIG. 3 is reconstructed into a fuzzy-neural network as shown in FIG. 2B, based on the weights in the network which has been subjected to a learning process and the structure of the thus obtained network is adopted as the rules for the system (see Japanese Patent Application Laid-Open Hei 6 No.119, 175, for example).

Further, there is a method of directly extracting fuzzy rules from data in place of educating the network (see Japanese Patent Application Laid-Open Hei 6 No.119,175, for example.)

Since in the conventional fuzzy-neural network system stated above, connection weights between nodes are set up at random values or at predetermined certain values, not only is it difficult to efficiently utilize previously known engineer's knowledge, but it also takes a prolonged period of time to educate the network.

In the case where a network is pre-constructed based on fuzzy rules created by engineers, there is a drawback that if there are some important rules other than the engineer's rules, it is impossible to extract such rules.

The configuration in which pure neuro-system is converted into a fuzzy-neural network so as to extract rules, requires a mass of data for the education. Therefore, it takes a prolonged period of time to educate the network. Besides there is another drawback that the reconstruction of the network requires complicated procedures.

In the case where fuzzy rules are directly extracted from data, not based on the education of the neural network or the like, there is a drawback that fine adjustment of the fuzzy rules should be done by a trial-and-error manner.

Further, facing a practical problem, there is a problem that the way of deriving a desired result by selecting factors to be modified and their amounts of modification is after all dependent on the engineers' trial-and error process.

SUMMARY OF THE INVENTION

It is therefore an object of the invention to provide a fuzzy-neural network system wherein the network can be educated with a small amount of data by efficiently utilizing previously known fuzzy rules to thereby converge the learning in a reduced period of time. It is another object of the invention to provide a fuzzy-neural network system wherein fuzzy rules can be extracted without reconstructing the network and if there are any important rules other than those created by experts, such rules can be extracted properly. It is still another object of the invention to provide a fuzzy-neural network system wherein degrees of importance as to input parameters can be determined so as to reduce an engineer's trial-and-error adjustment.

The invention has been achieved in order to attain the above objects.

In accordance with a first aspect of the invention, a fuzzy-neural network system includes: a fuzzy-neural network having function of learning wherein the learning is performed by determining degrees of coincidence of rules from combinations of membership functions for realizing fuzzy rules, constructing a network based on the number of input and output items in such a manner as to produce output in conformity with the degrees of coincidence, to thereby properly simulate relations between input and output as to sample data represented by a subject input pattern and a corresponding output pattern thereto; and a fuzzy rule setup portion for setting up fuzzy rules created by engineers into the fuzzy-neural network.

In accordance with a second aspect of the invention, a fuzzy-neural network system includes: a fuzzy-neural network having function of learning wherein the learning is performed by determining degrees of coincidence of rules from combinations of membership functions for realizing fuzzy rules, constructing a network based on the number of input and output items in such a manner as to produce output in conformity with the degrees of coincidence, to thereby properly simulate relations between input and output as to sample data represented by a subject input pattern and a corresponding output pattern thereto; and a fuzzy rule extracting portion for extracting fuzzy rules from the fuzzy-neural network after learning.

A fuzzy-neural network system in accordance with a third aspect of the invention is characterized in that the fuzzy rule extracting portion as a component of the second configuration includes at least one of the following extraction portions: one-input rule extracting portion for extracting fuzzy rules as to a certain input parameter; two-input rule extracting portion for extracting fuzzy rules as to certain two input parameters; and three-input rule extracting portion for extracting fuzzy rules as to certain three input parameters.

In accordance with a fourth aspect of the invention, a fuzzy-neural network system includes: a fuzzy-neural network having function of learning wherein the learning is performed by determining degrees of coincidence of rules from combinations of membership functions for realizing fuzzy rules, constructing a network based on the number of input and output items in such a manner as to produce output in conformity with the degrees of coincidence, to thereby properly simulate relations between input and output as to sample data represented by a subject input pattern and a corresponding output pattern thereto; and a degree-of-importance extracting portion for calculating contribution ratios of all input parameters affecting an output in the fuzzy-neural network after learning.

In the fuzzy-neural network system according to the first aspect of the invention, the learning operation is started after initial values of the connection weights between the rules and the output in the fuzzy neural network are set up based on the fuzzy rules created by engineers, by the fuzzy rule setup portion.

In the fuzzy-neural network system according to the second and third aspects of the invention, the fuzzy rule extracting portion extracts fuzzy rules from the connection weights between rules and the output in the fuzzy neural network having been educated.

In the fuzzy-neural network system according to the fourth aspect of the invention, the degree-of-importance extracting portion extracts contribution ratios (degrees of importance) of input parameters affecting the output based on the connection weights between rules and the output in the fuzzy neural network having been educated.

BRIEF DESCRIPTION OF THE DRAWINGS

FIG. 2A is a chart showing fuzzy rules;

FIG. 2B is a diagram showing a fuzzy-neural network constructed in conformity with the fuzzy rules in FIG. 2A;

FIG. 3 is a diagram showing a pure neuro-network system in accordance with a conventional example;

FIG. 11 is a chart showing weights for setting up fuzzy rules;

FIG. 12 is a chart showing weights for setting up fuzzy rules;

FIG. 13 is a chart showing weights for setting up fuzzy rules;

FIG. 14 is a chart showing weights for setting up fuzzy rules;

FIG. 15 is a chart showing weights for setting up fuzzy rules;

FIG. 16 is a chart showing weights for setting up fuzzy rules;

FIG. 19 is a table showing an educating data set for experiment;

FIG. 20 is a table showing an educating data set for experiment;

FIG. 21 is a table showing an educating data set for experiment;

FIG. 22 is a table showing data for verification;

FIG. 23 is a chart showing rules for verification relating to one input parameter;

FIG. 24 is a chart showing rules for verification relating to two input parameters;

FIG. 25 is a table showing experiment result;

FIG. 26 is a block diagram showing a fuzzy rule extracting portion shown in FIG. 4;

FIG. 27 is a chart showing extracted fuzzy rules relating to one input parameter;

FIG. 28 is a chart showing extracted fuzzy rules relating to one input parameter;

FIG. 29 is a chart showing extracted fuzzy rules relating to two input parameters;

FIG. 30 is a chart showing extracted fuzzy rules relating to two input parameters;

FIG. 31 is a chart showing extracted fuzzy rules relating to three input parameters.

DESCRIPTION OF THE PREFERRED EMBODIMENTS

Figure 1:
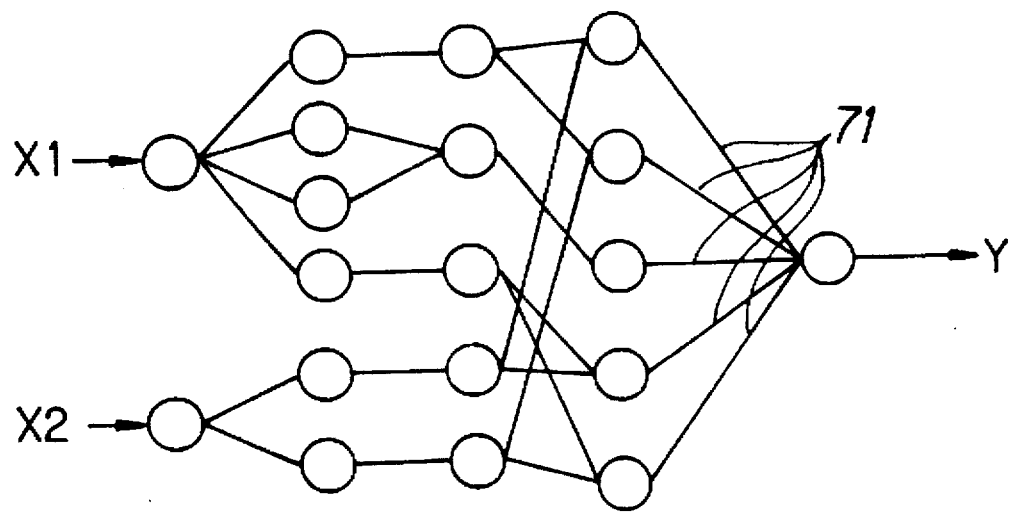
FIG. 1 is a diagram showing a conventional example of a network having no fuzzy function in its rear-half portion.
Figure 4:
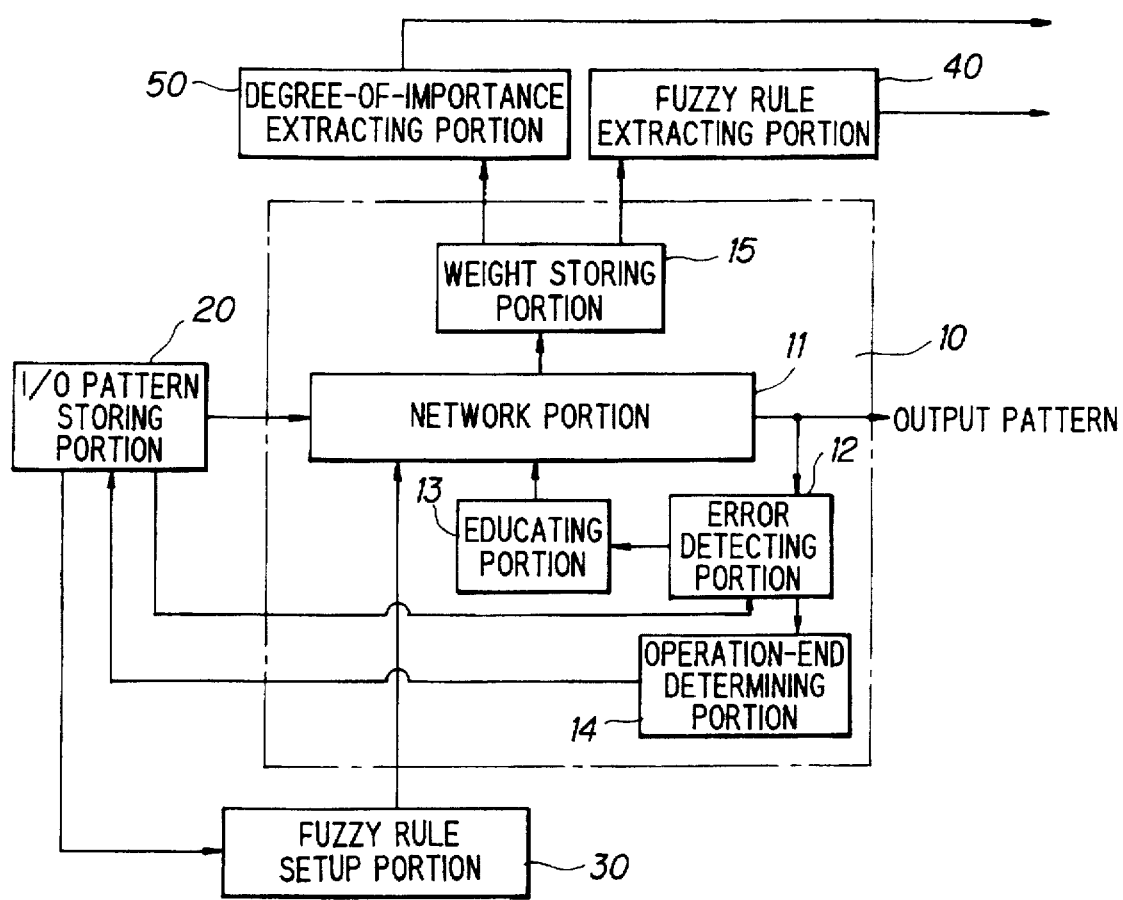
FIG. 4 is a block diagram showing an embodiment of a fuzzy-neural network system in accordance with the invention.

FIG. 4 a block diagram showing an embodiment of a fuzzy-neural network system in accordance with the invention. This system is composed of a fuzzy-neural network 10 having function of learning, input/output pattern storing portion 20 with stored input/output relations of sample data represented in a form of a subject input pattern and its corresponding output pattern, a fuzzy rule setup portion 30 setting up fuzzy rules created by engineers into the network, a fuzzy rule extracting portion 40 extracting fuzzy rules from the weights in the network after learning, and a degree-of-importance extracting portion 50 automatically extracting contribution ratios of input on output.

The fuzzy-neural network 10 having the educating function includes: a network portion 11 having a fuzzy-neural network; an error detecting portion 12 detecting deviation of the output pattern from the network portion 11 from a target output pattern stored in the I/O pattern storing portion 20; an educating portion 13 for educating the network portion 11 based on the error detected in the error detecting portion 12 so that the network portion 11 may properly simulate the pattern stored in the I/O pattern storing portion 20; an operation-end determining portion 14 for informing the I/O pattern storing portion 20 of the teaching end when the deviation detected in the error detecting portion 12 becomes a certain value or below; and a rule-weight storing portion 15 for storing weights or degrees of importance of rules in the network having been educated.

Figure 5:
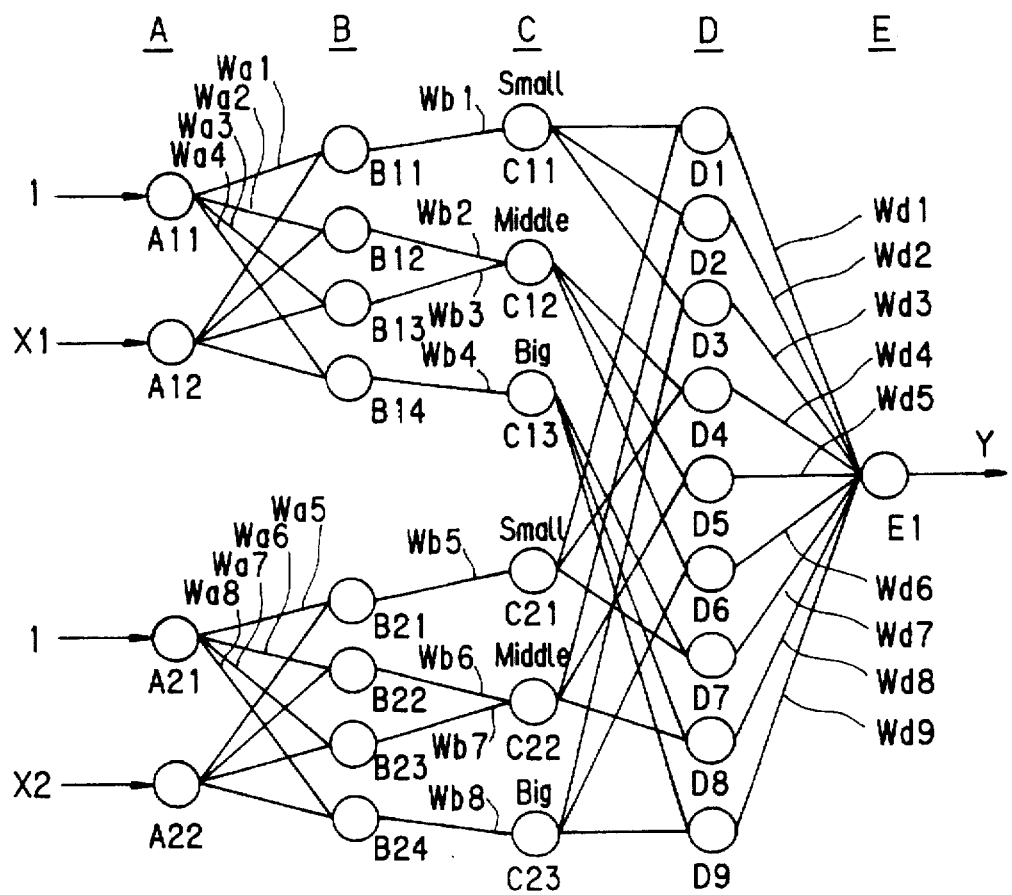
FIG. 5 is a structural diagram of a network portion shown in FIG. 4 and showing, a two input and one output fuzzy-neural network.

The network portion 11 is in a form of a two-input one-output fuzzy neural network as shown in FIG. 5, and composed of five layers, namely, an input layer A, a membership layer front half portion B, a membership layer rear-half portion C, a rule layer D and an output layer E. The second and third layers constitute a membership layer. The input layer A is composed of a pair of nodes A11 and A12 for an input parameter X1 and a pair of nodes A21 and A22 for another input parameter X2. The nodes A11 and A21 are both supplied with a constant '1' while the nodes A12 and A22 are supplied with input parameters X1 and X2, respectively.

Figure 6:
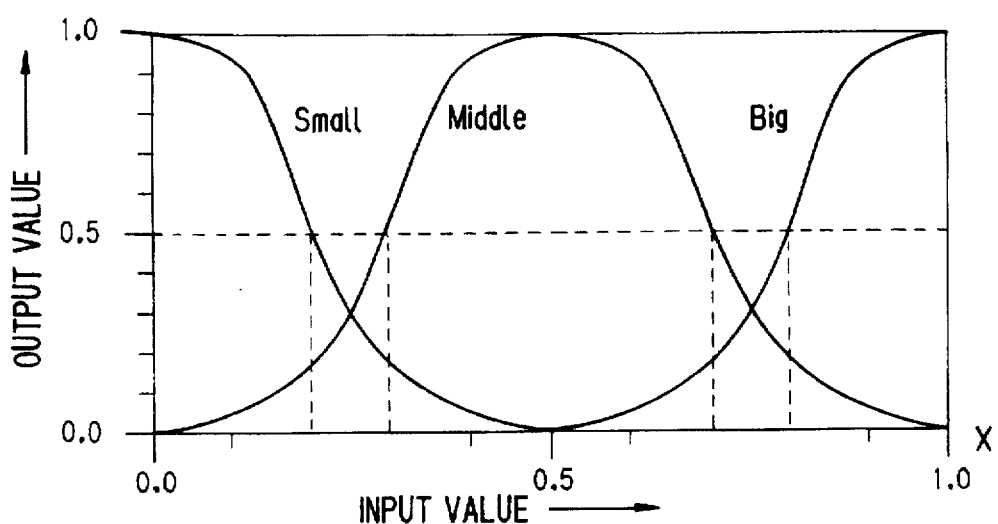
FIG. 6 is a chart showing membership functions used in the membership layer in the network shown in FIG. 5.

The membership layer of the front and rear halves B and C is constructed by membership functions for Big, Middle and Small for each of the input parameters X1 and X2, as shown in FIG. 6, so that each input is divided into three regions. That is, the front-half portion B is composed of a pair of four nodes B11 to B14 and B21 to B24. The input parameter X1 is coupled with the constant '1' in each of the nodes B11 to B14 while the input parameter X2 is coupled with the constant '1' in each of the nodes B21 to B24.

The rear-half portion C is composed of a pair of three nodes C11 to C13 and C21 to C23. Each node is coupled with one or two nodes in the front-half portion B. Specifically, nodes C11 and C21 which each are connected to one node form respective membership functions for Small while nodes C13 and C23 which each are also coupled with one node, form respective membership functions for Big. Nodes C12 and C22 which each are coupled with two nodes, form respective membership functions for Middle. This structure in the membership layer B and C is necessarily formed for every input parameter and is always composed of four nodes in the front-half portion B and three nodes in the rear-half portion C for each parameter.

The rule layer D is composed of: nodes D1 through D9 in such a manner that each node takes a logical product (AND-rule) between one of three outputs from the nodes on the input parameter X1 side in the membership layer rear-half portion C and one of three outputs from the nodes on the input parameter X2 side in the membership layer rear-half portion C. Specifically, the nodes D1 through D3 each make a logical product of the output from the node C11 and one of outputs from nodes C21 to C23; the nodes D4 through D6 each make a logical product of the output from the node C12 and one of outputs from nodes C21 to C23; and three nodes D7 through D9 each make a logical product of the output from the node C13 and one of outputs from nodes C21 to C23.

The number of nodes in the output layer E is determined depending on the number of output parameters. Outputs from all the nodes in rule layer D are totally put together in each of the nodes in the output layer. In this example, the output layer E is constructed so that one node E1 collects all the outputs from the rule layer D to produce an output Y.

Each connecting portion between two nodes in the thus configured network, has its own weight. Of these, there are three kinds of weights which are adjusted by educating the network. The first kind of these includes weights Wa1 through Wa8 representing central values of respective membership functions (the input value when the output value from the membership function is equal to 0.5). The second kind includes weights Wb1 through Wb8 representing gradient values of respective membership functions. The third kind includes weights Wd1 through Wd9 representing degrees of importance of corresponding rules. Other weights than those classified above are set at a fixed value (=1).

Figure 7:
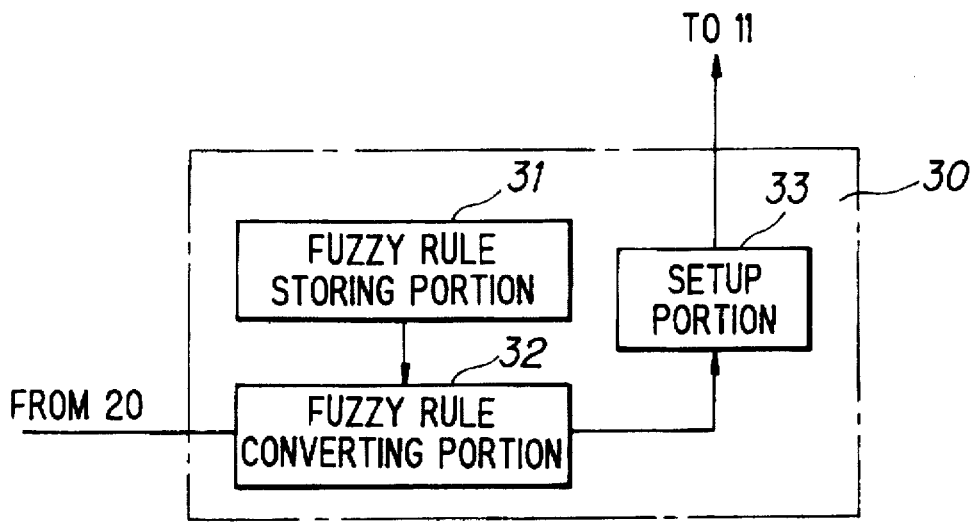
FIG. 7 is a block diagram showing a fuzzy rule setup portion shown in FIG. 4.

Next, description will be made on the fuzzy rule setup portion 30. The fuzzy rule setup portion 30 is a means for setting up rules created by engineers into the network portion 11 and is composed of, as shown in FIG. 7, a fuzzy rule storing portion 31 for storing fuzzy rules created by engineers, a fuzzy rule converting portion 32 for converting the fuzzy rules created by engineers into numeric values and a setup portion 33 for setting up weights in the network portion 11 based on the result from the fuzzy rule converting portion 32.

As regards to the fuzzy rule storing portion 31, fuzzy rules relating to a certain input item and a certain output item and fuzzy rules relating to certain two input items and a certain output item are created based on previously known knowledge to engineers and stored. The fuzzy rules relating to a certain input item and a certain output item, stored in this fuzzy rule storing portion 31, are simple ones created by engineers based on four functions (a) through (d) in FIG. 8 representing input/output relations and the following four fuzzy rules (a) through (d) corresponding to the four functions.

Figure 8:
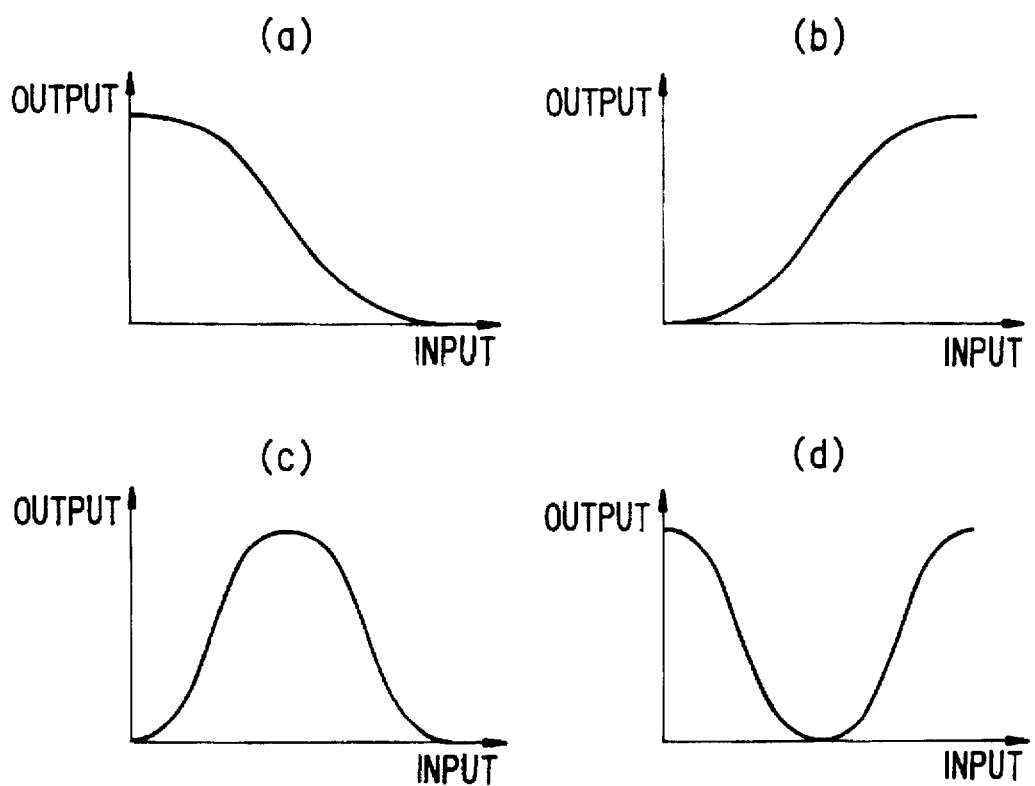
FIG. 8 shows charts depicting functions for one input-to-one output relations.

That is, the functions (a) through (d) shown in FIG. 8 are simple graph-representation of input/output relations. Knowledge previously known to engineers should be associated with these functions so as to create and store the following fuzzy rules (a) to (d) relating a certain input item and a certain output item.

The four rules are:

Rule (a): 'if input is Small then output is Big' or 'if input is Big then output is Small';

Rule (b): 'if input is Big then output is Big' or 'if input is Small then output is Small';

Rule (c): 'if input is Middle then output is Big' or 'if input is Big or Small then output is Small'; and Rule (d): 'if input is Middle then output is Small' or 'if input is Big or Small then output is Big'.

On the other hand, the fuzzy rules as to relations between certain two input items and a certain output item, stored in this fuzzy rule storing portion 31, are simple ones created by engineers based on sixteen functions created by combining two of the four functions (a) through (d) in FIG. 8.

Figure 9:
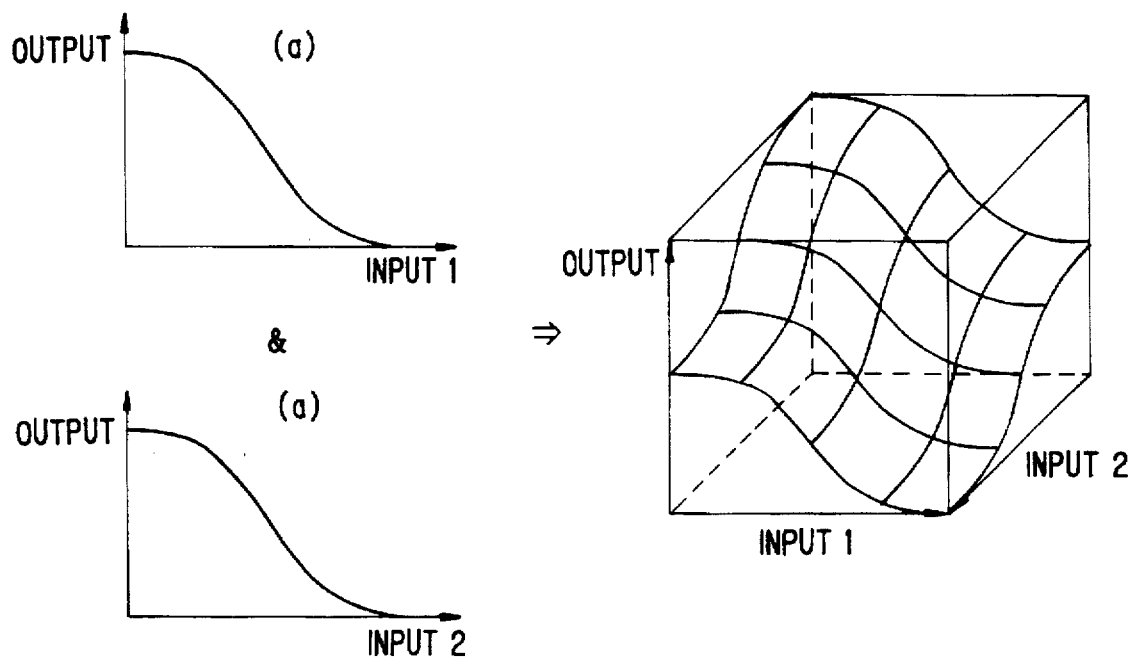
FIG. 9 shows charts depicting a function for a two input-to-one output relation.

A graph shown in FIG. 9 represents a three-dimensional function created by the combination of the function (a) and the function (a) shown in FIG. 8. The fuzzy rule (a) & (a) corresponding to this function is expressed as follows:

Rule (a) & (a): 'if input 1 is Small and input 2 is Small then output is Big' or 'if input 1 is Big and input 2 is Big then output is Small'.

Other than this, there are fifteen combinations: rules (a) & (a), (a) & (b), (a) & (c), . . . , (d) & (c) and (d) & (d). Some of them are written hereinbelow.

Rule (a) & (b): 'if input 1 is Small and input 2 is Big then output is Big' or 'if input 1 is Big and input 2 is Small then output is Small'.

Rule (a) & (c): 'if input 1 is Small and input 2 is Middle then output is Big' or 'if input 1 is Big and input 2 is Small or Big then output is Small'.

Rule (d) & (c): 'if input 1 is Small or Big and input 2 is Middle then output is Big' or 'if input 1 is Middle and input 2 is Small or Big then output is Small'.

Rule (d) & (d): 'if input 1 is Small or Big and input 2 is Small or Big then output is Big' or 'if input 1 is Middle and input 2 is Middle then output is Small'.

These rules created in this way are simple input/output relations so that it is possible to create and use those rules even if the engineer's knowledge is not clear. Here, if some relations between input and output are unknown, it is not necessary to create fuzzy rules as to such relations.

In the fuzzy rule converting portion 32, based on the input/output information in the I/O pattern storing portion 20 and the fuzzy rules stored in the fuzzy rule storing portion 31, the outputs from all the nodes relating to a certain fuzzy rule in the rule layer D are assigned with weights in a certain manner and this assignment of weights is done for all the fuzzy rules. In this operation, if the target is one of the fuzzy rules relating to a certain input item and a certain output item, all the nodes in the rule layer D relating to the specified input and output should be assigned with weights. When the target is one of the fuzzy rules relating to certain two input items and a certain output item, all the nodes in the rule layer D relating to the two input items and the output should be assigned with weights.

Figure 10:
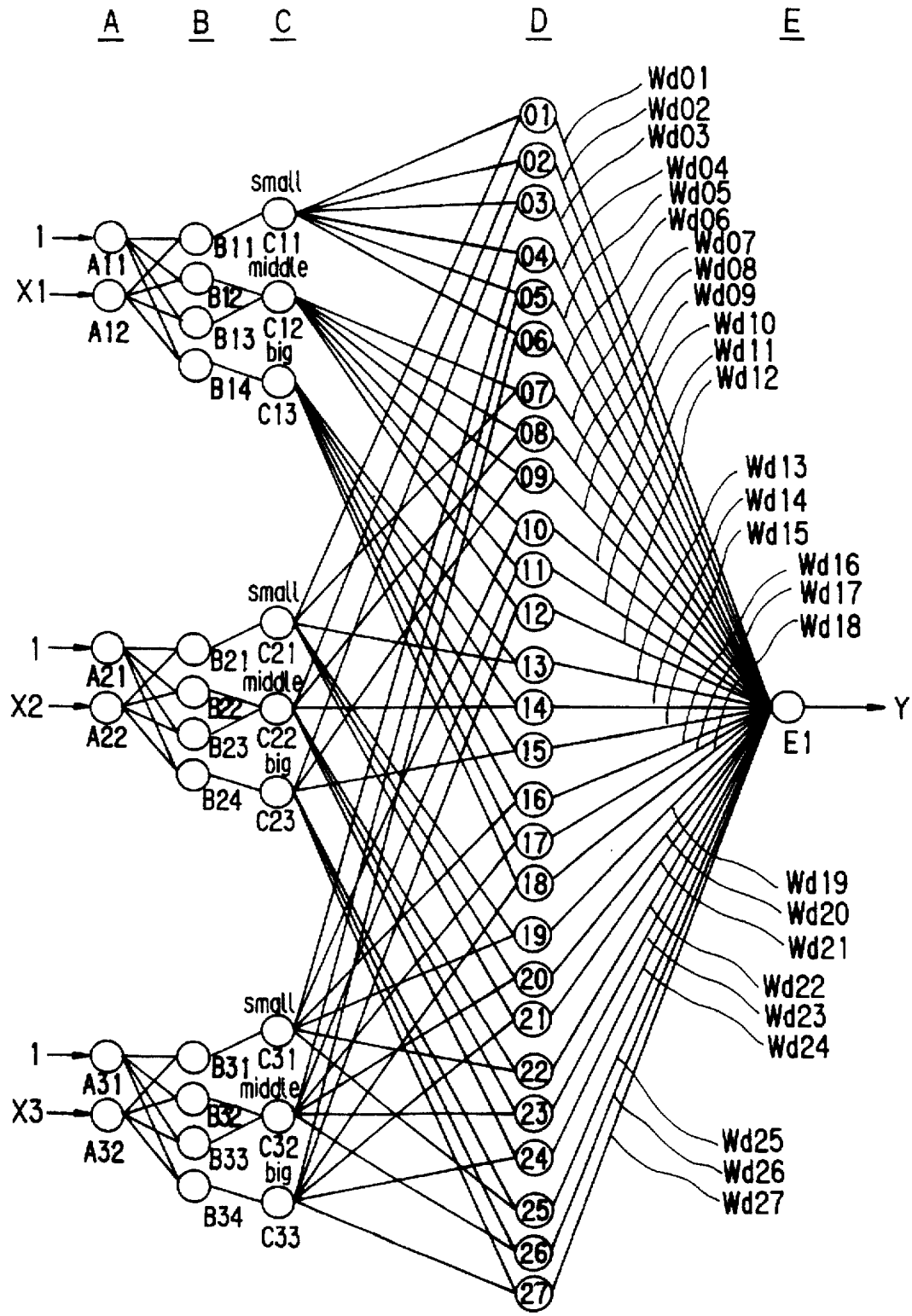
FIG. 10 is a structural diagram of a network portion shown in FIG. 4 and showing a three input and one output fuzzy-neural network.

Next, description will be made on a case in which the network portion 11 is configured with three inputs and one output. For creating the three input and one output configuration, a number of nodes should be added as shown in FIG. 10 to the two input and one output network configuration shown in FIG. 5. That is, as a third parameter X3 is added, two nodes A31 and A32 are provided in the input layer A. Four nodes B31 through B34 are added in the membership layer front-half portion B. Three nodes C31 through C33 are added in the membership layer rear-half portion C. As a result, the rule layer D is formed of 27 nodes D01 to D27 while the rule layer E is formed of one node E1.

When fuzzy rules made by engineers is set up in this network, suppose that the fuzzy rule storing portion 31 has fuzzy rules as follows:

Rule 1: if X1 is Middle then Y is Small;

Rule 2: if X2 is Big then Y is Big;

Rule 3: if X3 is Big then Y is Big; and

Rule 4: if X2 is Big and X3 is Big then Y is Big.

Next, description will be made on how weights in the network are assigned based on these fuzzy rules. First, as shown in FIG. 11, all the weights are set at zero as shown in FIG. 11 when there is no fuzzy rule set up. Next, as shown in FIG. 12, the weights are renewed for each fuzzy rule in such a way that if the output is small then the weight associated is allotted with −1 while if the output is big then the weight associated is allotted with +1.

In the above case, since Rule 1 is a fuzzy rule relating one input X1 with one output Y and is identical with the previous fuzzy rule (d), each node is weighted so that the function (d) in FIG. 8 may be realized. For this purpose, all the nodes relating to 'X1 is Small' are weighted with +1; all the nodes relating 'X1 is Middle' are weighted with −1; and all the nodes relating to 'X1 is Big' is allotted with +1. Here, the method of weighing should not be limited to this as long as the relation of big and small can be represented.

Rule 2 is a fuzzy rule relating one input X2 with one output Y and is identical with the previous fuzzy rule (b), therefore each node is weighted so that the function (b) in FIG. 8 may be realized. For this purpose, all the nodes relating to 'X2 is Small' are weighted with −1; all the nodes relating 'X2 is Middle' are weighted with 0; and all the nodes relating to 'X2 is Big' is allotted with +1. That is, the tables shown in FIG. 12 are renewed as those in FIG. 13.

Rule 3 is a fuzzy rule relating one input X3 with one output Y and is identical with the previous fuzzy rule (b), each node is weighted so that the function (b) in FIG. 8 may be realized. For this purpose, all the nodes relating to 'X3 is Small' are weighted with −1; all the nodes relating 'X3 is Middle' are weighted with 0; and all the nodes relating to 'X3 is Big' is allotted with +1. That is, the tables shown in FIG. 13 are renewed as those in FIG. 14.

Rule 4 is a fuzzy rule relating two input items X2 and X3 with one output Y and is identical with the previous fuzzy rule (b), each node is weighted so that the function (b) & (b) may be realized. For this purpose, all the nodes relating to 'X2 is Small' and 'X3 is Small' are weighted with −1; all the nodes relating 'X2 is Middle' and 'X3 is Middle' are weighted with 0; and all the nodes relating to 'X2 is Big' and 'X3 is Big' is allotted with +1. That is, the tables shown in FIG. 14 are renewed as those in FIG. 15.

In this case, weights 301 and 302 in FIG. 15 are renewed three times, specifically by Rule 2, Rule 3 and Rule 4 and have values of −3 and +3, respectively. However, if two of the three rules are known, the rest can be readily derived. Therefore, the weight 301 need not be renewed to be smaller than −2 and the weight 302 need not be renewed to be greater than +3. As a result of this consideration, the weights are determined as shown in FIG. 16. In this way, the weights are renewed as to all the rules stored in the fuzzy rule storing portion 31.

In the setup portion 33, based on the result of the fuzzy rule converting portion 32, appropriate values are setup for the rules connecting between rule layer D and the output layer E in the network portion 11. The result in the fuzzy rule converting portion 32 when the aforementioned rules 1 to 4 are set is as shown in FIG. 16.

Here, when it is supposed that the output Y from the network portion 11 is normalized or takes a value from 0.0 to 1.0, the weights Wd01 through Wd27 of the rules between the output node and respective nodes in the rule layer D basically take values from 0.0 to 1.0 since the output value Y is calculated by taking a weighted average of products between the outputs from the nodes D01 to D27 in the rule layer D and the weights Wd01 to Wd27 of the rules. In this view, the weights of rules between the output node and respective nodes in the rule layer D in the network portion 11 are to be set up in correspondence with the result of the fuzzy rule converting portion 32 so that resultant values from the fuzzy rule converting portion 32 may fall within a range of 0.0 to 1.0 or −2 and +2 are converted to 0.0 and 1.0, respectively.

Figure 17:
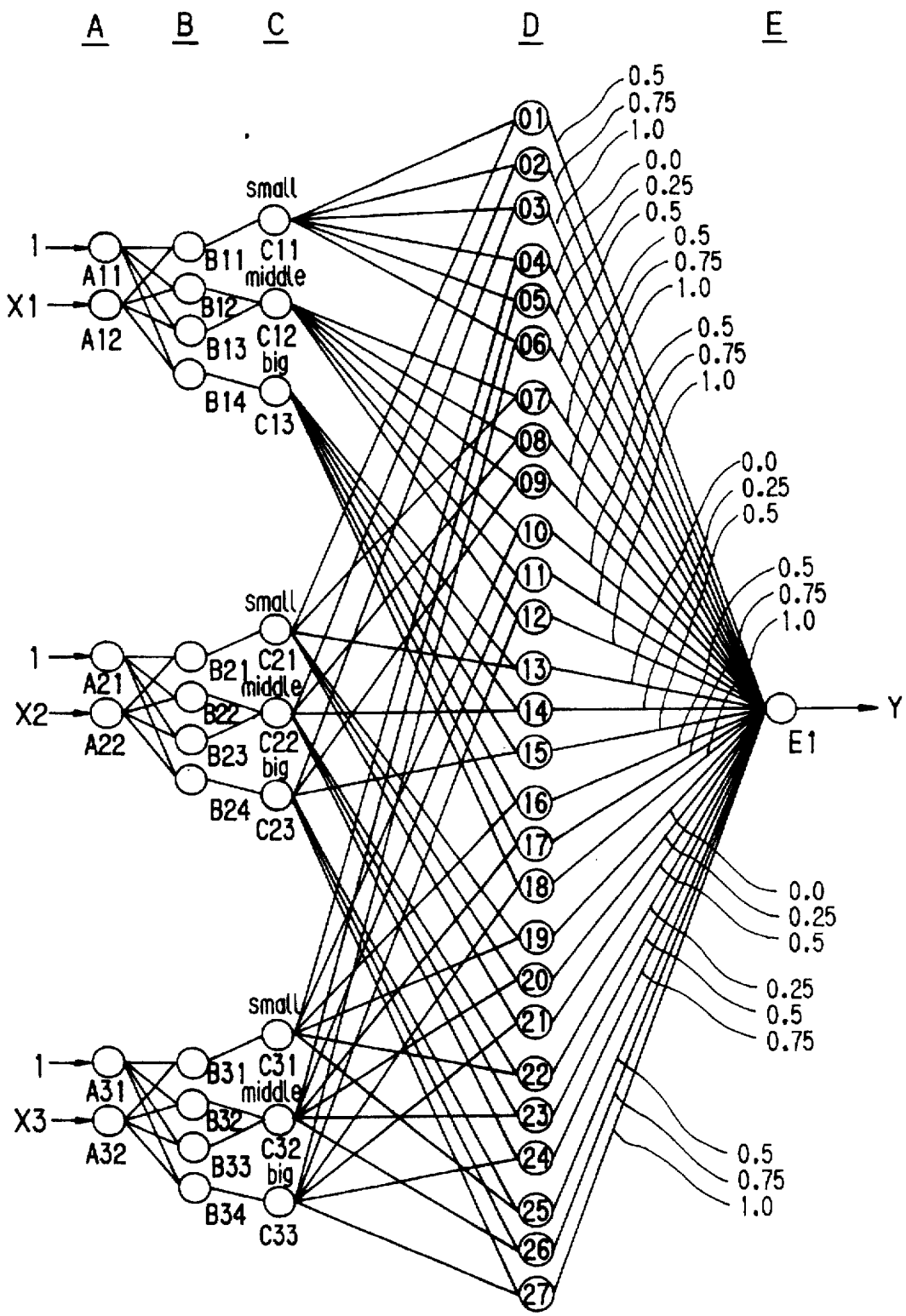
FIG. 17 is a structural diagram of a network portion shown in FIG. 4 and showing a three input and one output fuzzy-neural network with weights set up therein.
Figure 18:
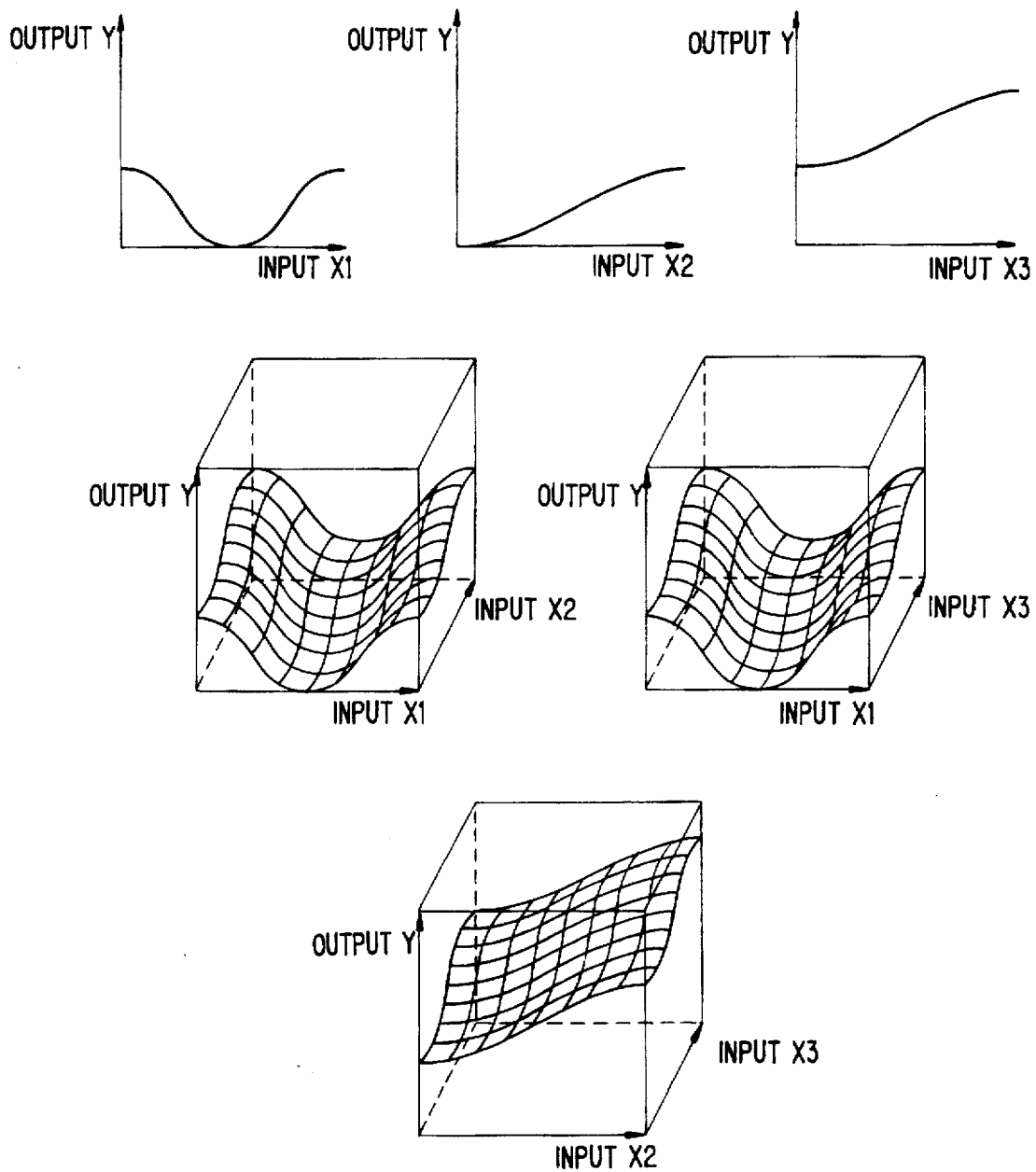
FIG. 18 shows charts representing functions of input/output relations in a fuzzy-neural network with fuzzy rules set up therein.

Actually set weights in the network are shown in FIG. 17 while FIG. 18 shows graphs of input/output relations in the network with actual fuzzy rules determined. Since the range of weights for rules between the output node and respective nodes in the rule layer D may change depending upon the method of calculation of the output, it is possible to appropriately set up the weights in the network portion 11 in conformity with the changed range.

Next, description will be made on the result of simulation in a workstation of a fuzzy-neural network of the invention. FIGS. 19, 20 and 21 show educating data sets for experiment. FIG. 22 shows data for verification. FIGS. 23 and 24 show fuzzy rules set up in the network portion. Simulation experiments with fuzzy rules and no fuzzy rule were both carried out in the following way. That is, a network having a network portion 11 with nine input items and one output was used. In the case of no fuzzy rule set up in the network portion 11, all the weights for rules are set randomly at the initial stage. In this condition, the network was educated with each of the three data sets until the error of the output from the output of the verification data became 0.236. In the case of fuzzy rules set up, the network was educated with each of the same three data sets in the same manner. The numbers of the repeated educating times were compared to evaluate the simulations. This result is shown in FIG. 25.

That is, the data sets shown in FIGS. 19 through 21 are to be used for educating the network. FIG. 22 shows data for verification which is used to verify to what degree the network has been educated. In educating the network portion with different educating data sets, the educating process for each of the different data sets is continued until the errors outputted in response to the verification data inputted into each of the differently educated networks are made to fall in the same range. The thus educated networks can be assumed to have capacities of the same level. The number of times of repeated education until the network learns to a certain level can be used to determine whether it is possible to educate the network with a lesser amount of educating data and what extent the educating time can be reduced to.

The simulation here includes the following steps:
1) effecting a single education of the network with educating data;
2) inputting the verification data to the network and calculating a total of deviations of the output values from the output layer from the verification output of the inputted verification data; and
3) repeating the above 1) and 2) until the total of deviations becomes 0.236 or less.

As seen in the experimental result shown in FIG. 25, with a few number of data (six pieces of educating data) and no fuzzy rule set up, it was impossible to reach the target requirement even after two hundred thousand times of education. In contrast, with six pieces of educating data and the fuzzy rules set up, 26,064 times of education could bring the network to the target level. From this result, it is understood that setting up some fuzzy rules enables the network to learn with a few number of data. With any of the educating data sets, the number of times of education when fuzzy rules were set up was reduced as compared to when no fuzzy rule was set up. From this result, it is understood that setting up fuzzy rules enables the network to learn in a reduced period of time.

Next, description will be made on the fuzzy rule extracting portion 40. As shown in FIG. 26, the fuzzy rule extracting portion 40 is composed of at least one of the following elements: one-input rule extracting portion 41 for extracting fuzzy rules as to one input parameter; two-input rule extracting portion 42 for extracting fuzzy rules as to two input parameters; and three-input rule extracting portion 43 for extracting fuzzy rules as to three input parameters. Any of the above three rule extracting portions 41, 42 and 43 extracts fuzzy rules based on the degrees of importance as to rules in the educated network, all of which are stored in the rule-weight storing portion 15. Here, the rule-weight storing portion 15 stores the internal state of the network portion 11 after learning or specifically stores the values of weights Wd01 through Wd27 for rules between the output layer E and respective nodes in the rule layer D.

The one-input rule extracting portion 41 extracts fuzzy rules as to relations of a certain input item with a certain output item from the input/output items in the educated network. That is, the one-input rule extracting portion 41 extracts fuzzy rules by the steps of notifying rules relating to a certain input item and a certain output item to pick up rules relating to the input and output items, summing up weights (degrees of importance) of the thus picked up rules for each of the membership functions for Small, Middle and Big to produce summations for Small, Middle and Big and comparing the summations for Small, Middle and Big one to another to extract, based on the compared result, a fuzzy rule as to the notified input item in a readily understandable form for engineers.

In the aforementioned three input and one output network (FIG. 10), when a fuzzy rule relating to input X1 and output Y is to be extracted, three summations as follows are calculated and compared to one another: the summation of weights Wd01 through Wd06 between the node E1 and respective nodes D01 through D06 relating to a rule 'X1 is Small' in the rule layer D; the summation of weights Wd07 through Wd12 between the node E1 and respective nodes D07 through D12 relating to a rule 'X1 is Middle' in the rule layer D; and the summation of weights Wd13 through Wd18 between the node E1 and respective nodes D13 through D18 relating to a rule 'X1 is Big' in the rule layer D.

From this result, fuzzy rules (as input conditions) relating to one input item when the output is big can be extracted in a readily understandable form for engineers, based on a converting scheme shown in FIG. 27. Specifically, if the one-input rule extracting portion 41 gives a comparison result of 'Summation for Small<Summation for Middle<Summation for Big', the converted rule (for the big output) is given as 'X1 is Big then Y is Big'. If 'Summation for Small>Summation for Middle>Summation for Big' is given, the converted rule is given as 'X1 is Small then Y is Big'. If 'Summation for Small<Summation for Middle>Summation for Big' is given, the converted rule is given as 'X1 is Middle then Y is Big'. If 'Summation for Small>Summation for Middle<Summation for Big' is given, the converted rule is given as 'X1 is Small or X1 is Big then Y is Big'.

It is also possible to extract fuzzy rules (as input conditions) relating to one input item when the output is small, in a readily understandable form for engineers, based on a converting scheme shown in FIG. 28. Specifically, if the one-input rule extracting portion 41 gives a comparison result of 'Summation for Small<Summation for Middle<Summation for Big', the converted rule (for the small output) is given as 'X1 is Small then Y is Small'. If 'Summation for Small>Summation for Middle>Summation for Big' is given, the converted rule is given as 'X1 is Big then Y is Small'. If 'Summation for Small<Summation for Middle>Summation for Big' is given, the converted rule is given as 'X1 is Small or X1 is Big then Y is Small'. If 'Summation for Small>Summation for Middle<Summation for Big' is given, the converted rule is given as 'X1 is Middle then Y is Small'. These comparisons are made for all the combinations of one input and one output or for arbitrary combinations of one input and one output.

Upon the comparison, the greater the variations of the summations for Small, Middle and Big, the greater the influence of the input upon the output. Therefore, by picking up all the rules having greater variation than a certain threshold, it is possible to extract only the important fuzzy rules. Alternatively, it is also possible to extract an arbitrary number of important fuzzy rules by picking up an arbitrary number of fuzzy rules in order of descending magnitude of the variation of the summations when the comparison is made.

Next, the two-input rule extracting portion 42 extracts fuzzy rules as to relations of certain two input items with a certain one output item from the input/output items in the educated network. That is, the two-input rule extracting portion 42 extracts fuzzy rules by the steps of notifying rules relating to certain two input items and a certain output item to pick up rules relating to only the input and output items, summing up weights (degrees of importance) of the thus picked up rules for each of the membership functions for Small, Middle and Big to produce summations for Small, Middle and Big and comparing the summations for Small, Middle and Big one to another to extract, based on the compared result, a fuzzy rule as to the notified two input items in a readily understandable form for engineers.

In the aforementioned three input and one output network (FIG. 10), when a fuzzy rule relating to two input parameters X1 and X2 and output Y is to be extracted, summations as follows are calculated for each of the parameters and analyzed: That is, first, the following three summations as to the behavior of input X1 are calculated: the summation of weights Wd01 through Wd03 between the node E1 and respective nodes D01 through D03 in the rule layer D, all the nodes relating to both the rule 'X1 is Small' and the input parameter X2; the summation of weights Wd07 through Wd09 between the node E1 and respective nodes D07 through D09 in the rule layer D, all the nodes relating to both the rule 'X1 is Middle' and the input parameter X2; and the summation of weights Wd13 through Wd15 between the node E1 and respective nodes D13 through D15 in the rule layer D, all the nodes relating to both the rule 'X1 is Big' and the input parameter X2. Then, the following three summations as to the behavior of input X2 are calculated: the summation of weights Wd01, Wd07 and Wd13 between the node E1 and respective nodes D01, D07 and D13 in the rule layer D, all the nodes relating to both the rule 'X2 is Small' and the input parameter X1; the summation of weights Wd02, Wd08 and Wd14 between the node E1 and respective nodes D02, D08 and D14 in the rule layer D, all the nodes relating to both the rule 'X2 is Middle' and the input parameter X1; the summation of weights Wd03, Wd09 and Wd15 between the node E1 and respective nodes D03, D09 and D15 in the rule layer D, all the nodes relating to both the 'X2 is Big' and the input parameter X1.

From this result, fuzzy rules (as input conditions) relating to two input items when the output is big can be extracted in a readily understandable form for engineers, based on a converting scheme shown in FIG. 29. It is also possible to extract fuzzy rules (as input conditions) relating to two input item when the output is small, in a readily understandable form for engineers, based on a converting scheme shown in FIG. 30. These comparisons are made for all the combinations of two input parameters and one output or for arbitrary combinations of two input parameters and one output.

Upon the comparison, the greater the variations of the summations for Small, Middle and Big, the greater the influence of the input upon the output. Therefore, by picking up all the rules having greater variation than a certain threshold, it is possible to extract only the important fuzzy rules. Alternatively, it is also possible to extract an arbitrary number of important fuzzy rules by picking up an arbitrary number of fuzzy rules in order of descending magnitude of the variation of the summations when the comparison is made.

Next, the three-input rule extracting portion 43 extracts fuzzy rules as to relations of certain three input items with a certain one output item from the input/output items in the educated network. That is, the three-input rule extracting portion 43 extracts fuzzy rules by the steps of notifying rules relating to certain three input items and a certain output item to pick up rules relating to only the input and output items, summing up weights (degrees of importance) of the thus picked up rules for all the combinations of the membership functions for Small, Middle and Big to produce summations for the combinations and selecting the combination producing a maximal summation or the combination producing a minimal summation, to extract, based on the result, a fuzzy rule as to the notified three input items in a readily understandable form for engineers.

In the aforementioned three input and one output network (FIG. 10), when a fuzzy rule relating to three input parameters X1, X2 and X3 and output Y is to be extracted, calculations of summing as shown in FIG. 31 are made. In the figure, item 401 indicates the summation of weight Wd01 between node D01 as to 'X1 is Small' and 'X2 is Small' and node E1, weight Wd04 between node D04 as to 'X1 is Small' and 'X3 is Small' and node E1, and weight Wd19 between node D19 as to 'X2 is Small' and 'X3 is Small' and node E1.

Such calculations are made for all the combinations. From the result of the calculations, a combination of input conditions producing a maximal summation is selected whereby a fuzzy rule (as input conditions) as to the three input items when the output is big is extracted in a readily understandable form for engineers. Specifically, suppose that the item 401 in FIG. 31 is the input combination producing a maximal value, the extracted fuzzy rule is:

'X1 is Small and X2 is Small and X3 is Small then Y is Big'.

From a combination of input conditions producing a minimal summation, the following fuzzy rule (as input conditions) as to the three input items when the output is small is obtained. For example, suppose that an item 402 is the input combination producing a minimal value, the extracted fuzzy rule is:

'X1 is Big and X2 is Big and X3 is Big then Y is Small'.

Upon the comparison, the greater the difference between the minimum and the maximum, the greater the influence of the input upon the output. Therefore, by picking up all the rules having greater difference than a certain threshold, it is possible to extract only the important fuzzy rules. Alternatively, it is also possible to extract an arbitrary number of important fuzzy rules by picking up an arbitrary number of fuzzy rules in order of descending magnitude of the differences when the comparison is made.

Thus extracted fuzzy rules may be displayed through a display or the like or outputted to the outside by any other means to present them in the readily understandable forms for engineers, whereby it is possible for the engineer to easily derive information on the items to be modified and the manner of the modification for obtaining a desired result in an actual problem, and consequently it is possible to reduce engineer's trial-and-error efforts.

Figure 32:
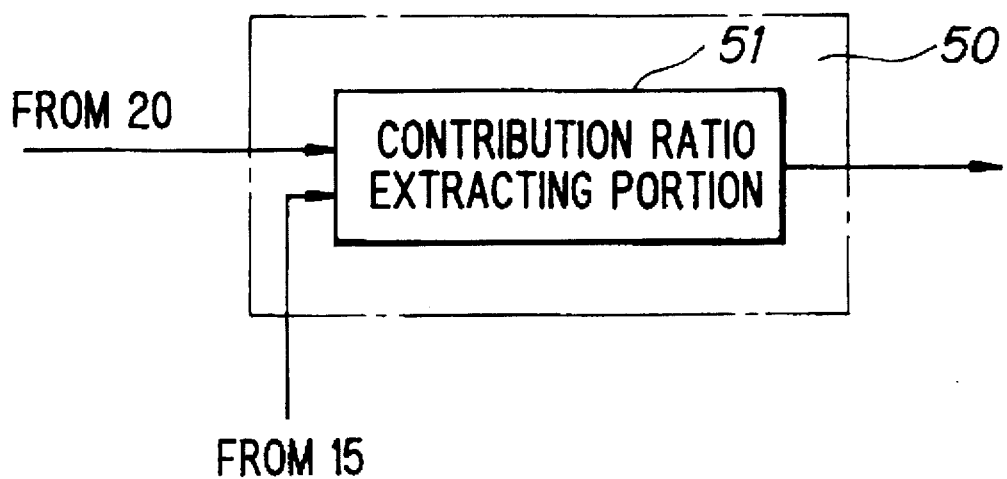
FIG. 32 is a block diagram showing a degree-of-importance extracting portion shown in FIG. 4.

Next, description will be made on the degree-of-importance extracting portion 50. As shown in FIG. 32, the degree-of-importance extracting portion 50 includes a contribution ratio extracting portion 51 for determining contribution ratios of input parameters affecting the output based on the degrees of importance of rules in the educated network stored in the weight storing portion 15.

The contribution ratio extracting portion 51 extracts a contribution ratio (degree of importance) of a certain input item affecting a certain output item. This process is performed by the step of: notifying a certain input item and a certain output item to pick up rules relating to the input and output items, summing up weights (degrees of importance) of the thus picked up rules for each of the membership functions for Small, Middle and Big to produce summations for Small, Middle and Big, calculating a variation quantity between the summation for Small and the summation for Middle and a variation quantity between the summation for Middle and the summation for Big, calculating an affecting quantity of each input item upon the output based on the variation quantities and determining a contribution ratio of the input item by calculating a ratio of the affecting quantity of the input item to the total of the affecting quantities of all the input items.

In the aforementioned three input and one output network (FIG. 10), when a contribution ratio (degree of importance) of the input X1 affecting the output Y, three summations ( ) as follows are calculated: the summation of weights Wd01 through Wd06 between the node E1 and respective nodes D01 through D06 relating to 'X1 is Small' in the rule layer D ((X1 is Small)); the summation of weights Wd07 through Wd12 between the node E1 and respective nodes D07 through D12 relating to a rule 'X1 is Middle' in the rule layer D ((X1 is Middle)); and the summation of weights Wd13 through Wd18 between the node E1 and respective nodes D13 through D18 relating to a rule 'X1 is Big' in the rule layer D ((X1 is Big)). Then, variation quantities H[1] and H[2] defined as the following formulae 1) and 2) are calculated.

$$H[1] = \Sigma(X1 \text{ is } Small) - \Sigma(X1 \text{ is } Middle))/N \qquad 1)$$

$$H[2] = \Sigma(X1 \text{ is } Middle) - \Sigma(X1 \text{ is } Big))/N \qquad 2)$$

where N is defined as follows:

$$N = (\text{the number of input items} - 1) \times 3. \qquad 3)$$

From the variation quantities H[1] and H[2], an affecting quantity E[1] of the input X1 on the output Y is determined as the following equation 4):

$$E[1] = H[1] + H[2] \qquad 4)$$

All the other affecting quantities E[i]s for the same output are also to be calculated and the contribution ratio K[i] for an input Xi affecting the output Y is obtained by the following formula 5):

$$K[i] = (E[i]/\Sigma_i E[i]) \times 100 \ (\%) \qquad 5)$$

where i is a number of an input parameter.

From this result, the contribution ratio of each input parameter affecting the output can be calculated. The above calculation is made for all the combinations of each input parameter and one output or for arbitrary combinations of each input parameter and one output. As a result, thus extracted contribution ratios (degrees of importance) may be displayed through a display or the like or outputted to the outside by any other means to present them to engineers, whereby it is possible for the engineer to easily derive information on the items to be modified and the manner of the modification for obtaining a desired result in an actual problem, and consequently it is possible to reduce engineer's trial-and-error efforts.

In accordance with the fuzzy-neural network system of the invention, it is possible to set up rules created by engineers as initial values for the connection weights in the rear-half portion of the network through the fuzzy rule setup portion. As a result, it is possible to efficiently utilize engineer's knowledge, whereby it is possible to educate the network with a lesser amount of data in a reduced educating time.

Further, in accordance with the fuzzy-neural network system of the invention, it is possible to extract fuzzy rules in readily understandable forms for engineers by means of the fuzzy rule extracting portion. Since the network is constructed based on all the input and output items, it is possible to obtain fuzzy rules which the engineer has not recognized.

In accordance with the fuzzy-neural network system of the invention, it is possible to calculate contribution ratios (degrees of importance) of all the input parameters on the output by means of the degree-of-importance extracting portion. As a result, it is possible to know affecting relations between input and output items and affecting manners of input items upon output items.

Moreover, the extraction of fuzzy rules by the fuzzy rule extraction portion and extraction of the contribution ratios (degrees of importance) of input items by the degree-of-importance extracting portion allow engineers to easily derive information on the items to be modified and the manner of the modification for obtaining a desired result in an actual problem. As a result it is possible to reduce engineer's trial-and-error efforts.

What is claimed is:

1. A fuzzy-neural network system comprising:

a fuzzy-neural network having function of learning, said learning being performed by determining degrees of coincidence of rules from combinations of membership functions for realizing fuzzy rules, constructing a network based on the number of input and output items in such a manner as to produce output in conformity with the degrees of coincidence, to thereby properly simulate relations between input and output as to sample data represented by a subject input pattern and an output pattern corresponding thereto, said network having an input layer composed in accordance with the number of said input items so as to be composed of a pair of nodes for each one of said input items;

a membership layer front-half portion coupled with the input layer and composed with each input item;

a membership layer rear-half portion coupled with the membership layer front-half portion and composed with each input item;

a rule layer coupled with the membership layer rear-half portion and performing an operation upon a first output from the membership layer rear-half portion, based on a certain input item, and upon a second output from the membership layer rear-half portion, based on another input item different from said certain input item; and an output layer coupled with the rule layer and composed of at least one node, the number of nodes being determined in accordance with the number of output items; and a fuzzy rule setup portion for setting up fuzzy rules created by engineers into said fuzzy-neural network, said setting up being carried out by setting up weights for coupling between the rule layer and the output layer of the fuzzy neural network, based on a fuzzy rule.

2. A fuzzy-neural network system comprising:

a fuzzy-neural network having function of learning, said learning being performed by determining degrees of coincidence of rules from combinations of membership functions for realizing fuzzy rules, constructing a network based on the number of input and output items in such a manner as to produce output in conformity with the degrees of coincidence, to thereby properly simulate relations between input and output as to sample data represented by a subject input pattern and an output pattern corresponding thereto, said network having an input layer composed in accordance with the number of said input items so as to be composed of a pair of nodes for each one of said input items;

a membership layer front-half portion coupled with the input layer and composed with each input item;

a membership layer rear-half portion coupled with the membership layer front-half portion and composed with each input item;

a rule layer coupled with the membership layer rear-half portion and performing an operation upon a first output from the membership layer rear-half portion, based on a certain input item, and upon a second output from the membership layer rear-half portion, based on another input item different from said certain input item; and an output layer coupled with the rule layer and composed of at least one node, the number of nodes being determined in accordance with the number of output items; and a fuzzy rule extracting portion for extracting each fuzzy rule from one or more weight values obtained from coupling between the rule layer and the output layer of said fuzzy-neural network, after learning.

3. A fuzzy-neural network system according to claim 2 wherein said fuzzy rule extracting portion includes at least one of the following extraction portions: one-input rule extracting portion for extracting fuzzy rules as to a certain input parameter; two-input rule extracting portion for extracting fuzzy rules as to certain two input parameters; and three-input rule extracting portion for extracting fuzzy rules as to certain three input parameters.

4. A fuzzy-neural network system comprising:

a fuzzy-neural network having function of learning, said learning being performed by determining degrees of coincidence of rules from combinations of membership functions for realizing fuzzy rules, constructing a network based on the number of input and output items in such a manner as to produce output in conformity with the degrees of coincidence, to thereby properly simulate relations between input and output as to sample data represented by a subject input pattern and an output pattern corresponding thereto, said network having an input layer composed in accordance with the number of said input items so as to be composed of a pair of nodes for each one of said input items;

a membership layer front-half portion coupled with the input layer and composed with each input item;

a membership layer rear-half portion coupled with the membership layer front-half portion and composed with each input item;

a rule layer coupled with the membership layer rear-half portion and performing an operation upon a first output from the membership layer rear-half portion, based on a certain input item, and upon a second output from the membership layer rear-half portion, based on another input item different from said certain input item; and an output layer coupled with the rule layer and composed of at least one node, the number of nodes being determined in accordance with the number of output items; and a degree-of-importance extracting portion which extracts, for each input, a respective contribution ratio of each input on each output, based upon one or more weight values of coupling between said rule layer and said output layer of said fuzzy neural network, after learning.

* * * * *